UNITED STATES PATENT OFFICE 2,681,862

MANGANOUS ALUMINUM SILICATE COMPOUND AND METHOD OF MAKING THE SAME

Elbert E. Fisher, deceased, late of St. Louis, Mo., by Marlew W. Fisher, executrix, St. Louis, Mo., assignor to Marlew W. Fisher, St. Louis, Mo., individually No Drawing. Application March 22, 1951, Serial No. 217,068

6 Claims. (Cl. 106—65)

The present invention relates generally to the manufacture of a manganous aluminum silicate mixed crystal, and more particularly to the manufacture of a manganous aluminum silicate mixed crystal having a novel crystalline formation whereby improved refractory and abrasive properties are obtained.

It is an object of the present invention to provide a novel manganous aluminum silicate mixed crystal which is highly resistant to the corrosive action of molten steel and molten glass so as to be especially applicable for use in the manufacture of tank blocks.

Another object is to provide a novel manganous aluminum silicate mixed crystal which has a relatively low coefficient of expansion.

Another object is to provide a novel manganous aluminum silicate mixed crystal which is relatively hard so as to be especially applicable for forming abrasives.

Further objects and advantages of the present invention will be apparent from the following description.

In general, the present invention comprises the formation of a new mixed crystal by adding together manganous, aluminous and siliceous compounds such as manganous oxide (MnO), alumina ($Al_2O_3$), and silica ($SiO_2$) in predetermined portions, fusing them together, and then cooling the product so as to form two intertwined crystalline structures, one of which is tri-aluminum silicate ($3Al_2O_3 \cdot SiO_2$), and the other is $$MnO \cdot Al_2O_3 \cdot SiO_2$$

which so far is unnamed.

In Patent No. 2,389,352, issued November 20, 1945, the manufacture of a novel crystalline tri-aluminum silicate product is described which has the chemical formula $3Al_2O_3 \cdot SiO_2$ and which is especially applicable for use in a refractory block; and which, when ground and mixed with a binder, provides an especially good abrasive. This tri-aluminum silicate has a specific gravity of 3.30, an index of refraction of 1.665, and a hardness of 9. plus.

It was later determined that the hardness of this product could be appreciably increased by the addition of a predetermined percentage of manganous material. A petrographic analysis disclosed that the addition of manganous oxide produced a new crystalline formation which acts as a reinforcement to the existing crystalline structure of the tri-aluminum silicate. These crystals appear as a lattice-like formation which intertwine themselves throughout the entire structure so as to bind it together more closely. The index of refraction of this new product is increased to 1.7, and its coefficient of expansion is comparable to that of magnesite. Furthermore, the characteristics of this new product are such that it has exceedingly good annealing properties.

In the tri-aluminum silicate described in Patent No. 2,389,352, the alumina is the basic radical and the silica acts as an acid radical. In this new crystalline structure, the chemical formula appears to be $MnO \cdot Al_2O_3 \cdot SiO_2$, and the manganous oxide acts as the base and the alumina and silica are acidic. It appears that this new crystalline structure results from the combining of manganous oxide (MnO) with a form of allophane ($Al_2O_3 \cdot SiO_2 \cdot 3H_2O$), the water of crystallization of the latter being driven off by heating.

In carrying out the process of making this improved product, 83.6% by weight alumina ($Al_2O_3$), 3% manganous oxide (MnO), and 13.4% silica ($SiO_2$) in a dry state and of a size to pass through a one hundred mesh or finer screen, are thoroughly mixed together. This corresponds to a mol ratio of 1 mol $MnO:5.3\ SiO_2:19.5Al_2O_3$. These materials are then placed in an electric furnace which is clean of all foreign matter other than the remains of prior batches of this same material, which might have clung to the inner surface of the furnace. The ventilation about the furnace should be uniform so that no hot spots or cold spots are produced.

The fusion pool should be started at the center and the material melted quickly, and brought to a temperature of between 3800–4200° F. For example, one ton of the material should be melted in about fifteen minutes.

The melt should then be quickly poured off in a large stream into molds to form blocks or shapes of the form desired. In carrying out the molding operation, it is desirable to have the molds at a temperature which will cause the extreme edges of the blocks or the like to chill fast and first. The insides of the blocks or the like should not chill too fast. Care should also be taken to assure that the castings do not cool too quickly, so as to prevent air spaces from being formed in the block.

The castings are then annealed by slowly heating them to about 2800° F., and then slowly cooled for about twelve to fifteen hours. This annealing or tempering makes the castings stronger and harder, and produces a product which has a coefficient of expansion of about .10.

It has been determined that the optimum crystalline structure occurs when the alumina is 83.6%, by weight, of the mixture. However, satisfactory results are obtained when the percentage of alumina is between 79 and 87.

The new crystalline structure $MnO \cdot Al_2O_3 \cdot SiO_2$ produced by the addition of manganous oxide in the amount indicated amounts to between 5–7%, by weight, of the total mixed crystal product. This corresponds to a mol ratio in the mixed crystal of one mol of $MnO \cdot Al_2O_3 \cdot SiO_2$ to ten mols of $3Al_2O_3 \cdot SiO_2$.

Thus, it is apparent that there has been provided a novel manganous aluminum silicate mixed crystal which fulfills all of the objects and advantages sought therefor. This new mixed crystal is not disintegrated even under high temperature by corrosive furnace batches. It has a high density and an extremely low coefficient of thermal expansion, thereby giving it great mechanical strength and the ability to withstand rapid changes in temperature without fracturing. The material of the product, because of its density and hardness, is also capable of being employed as an abrasive when comminuted and bonded with a suitable binder.

It is to be understood that the foregoing description has been given only by way of illustration and example, and that changes and alterations in the present disclosure, which will be readily apparent to one skilled in the art, are contemplated as within the scope of the present invention, which is limited only by the claims which follow.

What is claimed is:

1. The method of forming a manganous aluminum silicate mixed crystal, having the formula $3Al_2O_3 \cdot SiO_2$—$MnO \cdot Al_2O_3 \cdot SiO_2$ comprising the steps of mixing together about 83.6 percent alumina, 3 percent manganous oxide, and 13.4 percent silica; heating the mixture to a temperature of between 3800–4200 degrees F.; and then cooling it.

2. A vitrified product formed by mixing together aluminous, siliceous, and manganous materials; heating the mixture to a temperature of at least about 3800 degrees F.; and then cooling, the product being characterized by at least two different crystalline structures, the one being represented by the formula $3Al_2O_3 \cdot SiO_2$, and the other by the formula $MnO \cdot Al_2O_3 \cdot SiO_2$, said last named crystal being present in the amount of 5 to 7% by weight.

3. A vitrified crystalline product having the formula $3Al_2O_3 \cdot SiO_2$—$MnO \cdot Al_2O_3 \cdot SiO_2$ formed by mixing together about 83.6 percent alumina, 3 percent manganous oxide, and 13.4 percent silica; heating the mixture to a temperature of between 3800–4200 degrees F.; cooling it and then heating the product to 2800° F. and cooling it.

4. A product comprising alumina, manganous oxide, and silica; the product being characterized by having at least two different crystalline structures, one being represented by the formula $3Al_2O_3 \cdot SiO_2$ and the other by the formula $MnO \cdot Al_2O_3 \cdot SiO_2$, said last named crystal being present in the amount of 5 to 7% by weight.

5. A product comprising alumina, manganous oxide, and silica; the product being characterized by having at least two different intertwined crystalline structures, one being represented by the formula $3Al_2O_3 \cdot SiO_2$ and the other by the formula $MnO \cdot Al_2O_3 \cdot SiO_2$, said last named crystal being present in the amount of 5 to 7% by weight.

6. The method of forming a manganous aluminum silicate mixed crystal, having the formula $3Al_2O_3 \cdot SiO_2$—$MnO \cdot Al_2O_3 \cdot SiO_2$ comprising the steps of mixing together about 83.6 percent alumina, 3 percent manganous oxide, and 13.4 percent silica; heating the mixture to between 3800–4200 degrees F.; cooling it; heating the product so formed to about 2800 degrees F.; and then slowly cooling it for about twelve hours.

References Cited in the file of this patent

UNITED STATES PATENTS

| Number | Name | Date |
| --- | --- | --- |
| 788,132 | Glynn | Apr. 25, 1905 |
| 1,087,705 | Allen | Feb. 17, 1914 |
| 1,572,730 | Locke et al. | Feb. 9, 1926 |
| 1,759,919 | Singer | May 27, 1930 |
| 2,290,107 | Luks | July 14, 1942 |

OTHER REFERENCES

Mellor, "Comprehensive Treatise on Inorganic and Theoretical Chemistry," vol. 6, pages 892–901; Longmans, Green & Co., N. Y. C. 1925.

Hoffman, "Lexikon der Anorganischen Verbindungen" Band 2, No. 56–81, pages 81, 82. Published by Verlag Von Johann Ambrosius Barth, Leipzig, Germany, 1912–14.

Snow, "Jour. Am. Cer. Soc., vol. 26, Jan. 1943, pages 11–20.